United States Patent
Atlan et al.

(10) Patent No.: US 11,099,522 B2
(45) Date of Patent: Aug. 24, 2021

(54) DEVICES AND METHODS FOR OPTICAL IMAGING BY MEANS OF OFF-AXIS DIGITAL HOLOGRAPHY

(71) Applicants: CENTRE NATIONAL DE LA RECHERCHE SCIENTIFIQUE (CNRS), Paris (FR); ECOLE SUPÉRIEURE DE PHYSIQUE ET DE CHIMIE INDUSTRIELLES DE LA VILLE DE PARIS, Paris (FR)

(72) Inventors: Michael Atlan, Paris (FR); Jean-Pierre Huignard, Paris (FR)

(73) Assignees: CENTRE NATIONAL DE LA RECHERCHE SCIENTIFIQUE (CNRS), Paris (FR); ECOLE SUPÉRIEURE DE PHYSIQUE ET DE CHIMIE INDUSTRIELLES, Paris (FR); DE LA VILLE DE PARIS, Paris (FR)

( * ) Notice: Subject to any disclaimer, the term of this patent is extended or adjusted under 35 U.S.C. 154(b) by 17 days.

(21) Appl. No.: 16/499,770

(22) PCT Filed: Mar. 30, 2018

(86) PCT No.: PCT/EP2018/058349
§ 371 (c)(1),
(2) Date: Feb. 11, 2020

(87) PCT Pub. No.: WO2018/178366
PCT Pub. Date: Oct. 4, 2018

(65) Prior Publication Data
US 2020/0233378 A1  Jul. 23, 2020

(30) Foreign Application Priority Data
Mar. 31, 2017 (FR) ...................... 1752775

(51) Int. Cl.
*G03H 1/04* (2006.01)
*G03H 1/00* (2006.01)

(52) U.S. Cl.
CPC .......... *G03H 1/041* (2013.01); *G03H 1/0443* (2013.01); *G03H 2001/005* (2013.01); *G03H 2001/0445* (2013.01)

(58) Field of Classification Search
CPC ................ G03H 1/041; G03H 1/0443; G03H 2001/005; G03H 2001/0445;
(Continued)

(56) References Cited

U.S. PATENT DOCUMENTS

| 2012/0200901 A1* | 8/2012 | Dubois | G03H 1/0443 |
| | | | 359/15 |
| 2015/0292858 A1* | 10/2015 | Allan | G03H 1/0866 |
| | | | 356/457 |
| 2017/0003650 A1 | 1/2017 | Moser et al. | |

FOREIGN PATENT DOCUMENTS

FR         2997518 A1      5/2014

OTHER PUBLICATIONS

Ciapurin, I. et al.; "Modeling of phase volume diffractive gratings, part 1: transmitting sinusoidal uniform gratings"; Optical Engineering, vol. 45(1), Jan. 2006 (9 pages).
(Continued)

*Primary Examiner* — Michael A Lyons
(74) *Attorney, Agent, or Firm* — Osha Bergman Watanabe & Burton LLP

(57) ABSTRACT

According to one aspect, the invention concerns an optical imaging device (20) for an object (OBJ) by off-axis holography comprising a light source (21) adapted for emitting an
(Continued)

illumination wave ($E_I$) on the object, in transmission or reflection, and an assembly formed by one or more thick Bragg gratings (22) for receiving a wave ($E_O$) coming from the object thus illuminated and for deflecting a first component ($E_R$) of the wave coming from the object, called the reference wave, and to allow a second component ($E_S$) of the wave coming from the object, called the signal wave, to pass without deflection in such a way that the deflected reference wave presents predetermined deflection angles with respect to the non-deflected signal wave defined in two perpendicular planes. The imaging device according to the first aspect further comprises a two-dimensional detection device (23) for acquiring an interferogram resulting from the interference between said deflected reference wave and said signal wave and a computing unit for determining, from said interferogram, an amplitude and phase distribution of the signal wave in the plane of the object (hologram).

6 Claims, 7 Drawing Sheets

(58) Field of Classification Search
CPC ........ G03H 2001/0413; G01B 9/02047; G01B 9/02057; G01B 9/021
See application file for complete search history.

(56) References Cited

OTHER PUBLICATIONS

Efimov, O. et al.; "High-efficiency Bragg gratings in photothermorefractive glass"; Applied Optics, vol. 38, No. 4, Feb. 1, 1999, pp. 619-627 (9 pages).
Garcia-Sucerquia, J. et al.; "Digital in-line holographic microscopy"; Applied Optics, vol. 45, No. 5, Feb. 10, 2006, pp. 836-850 (15 pages).
Kogelnik, H.; "Coupled Wave Theory for Thick Hologram Gratings"; The Bell System Technical Journal, vol. 48, No. 9, Nov. 1969, pp. 2909-2947 (39 pages).
Marquet, P. et al.; "Digital holographic microscopy: a noninvasive contrast imaging technique allowing quantitative visualization of living cells with subwavelength axial accuracy"; Optics Letters, vol. 30, No. 5, Mar. 1, 2005, pp. 468-470 (3 pages).
Smartt, R. et al.; "Point-diffraction interference microscopy"; Applied Optics, vol. 24, No. 10, May 15, 1985, pp. 1402-1403 (2 pages).
Verrier, N. et al.; "Off-axis digital hologram reconstruction: some practical considerations"; Applied Optics, vol. 50, No. 34, Dec. 1, 2011, pp. 136-146 (11 pages).
International Search Report issued in PCT/EP2018/058349 dated Jun. 22, 2018 (6 pages).
Written Opinion of the International Searching Authority issued in PCT/EP2018/058349 dated Jun. 22, 2018 (9 pages).
Leith, E. et al.; "Imaging through scatttering media with holography"; Journal of the Optical Society of America A, vol. 9, No. 7, Jul. 1992, pp. 1148-1153 (6 pages).

\* cited by examiner

DEVICES AND METHODS FOR OPTICAL IMAGING BY MEANS OF OFF-AXIS DIGITAL HOLOGRAPHY

STATE OF THE ART

Technical Field of the Invention

This invention concerns optical imaging devices and methods using off-axis digital holography and applies in particular to microscopic imaging, in particular of transparent or reflective objects.

State of the Art

Phase contrast microscopy developed as early as the 1940s for the observation of transparent microscopic objects. Indeed, in the fields of biology for example, most microscopic objects, such as living cells, are transparent and differ only slightly from their surroundings in terms of absorption or colour, resulting in very small variations in the amplitude of a light wave used in conventional microscopy. Phase contrast microscopy allows the detection of variations in the refractive index within the object to form an image. In particular, interferometric techniques based on interference between a light beam transmitted or reflected by the object and a reference light beam have provided access to quantitative measurements of the phase distribution within the studied objects.

More specifically, digital holographic phase microscopy has proven to be a very powerful technique for the quantitative analysis of local variations in the refractive index of a transparent object. Indeed, digital holography, which includes the digital recording of an interferogram by a digital camera and the digital reconstruction of holograms, gives simultaneous access to the intensity and phase of the propagating wave.

Numerical on-axis holography, developed on the basis of Gabor's work, and described for example in the article by J. Garcia-Sucerquia et al. ("*Digital in-line holographic microscopy*", Applied Optics, Vol. 45, No 5 (2006)), a diagram of which is reproduced in FIG. 1A, has resulted in imaging devices that are particularly easy to use. As illustrated in FIG. 1A, a light beam emitted by a laser source L is sent to a hole P forming a source point. A first spherical wave emerges from the source point P and illuminates an object of study O; this results in a wave coming from the object, called a signal wave, whose electromagnetic field is noted $E_S$. The signal wave interferes with a spherical wave coming from point P, called the reference wave, whose electromagnetic field is noted $E_R$. The acquisition of the interference signal by a two-dimensional detector (detection plane C) results in an interference pattern or interferogram I which can be expressed by equation (1) below:

$$I = |E_S + E_R|^2 = |E_S|^2 + |E_R|^2 + E_S E_R^* + E_S^* E_R \quad (1)$$

These systems, which allow the skilled person to create Gabor holograms, are however limited in sensitivity due to the spatial superposition of the useful signal $E_S E_R^*$ (where * represents the complex conjugation) with the other interference terms in the interferogram.

Off-axis digital holography, an example of implementation of which is described in the article by P. Marquet et al. ("*Digital holographic microscopy: a non-invasive contrast imaging technique allowing quantitative visualization of living cells with sub-wavelength axial accuracy*", Optics letters, vol. 30, No 5 (2005)) allows, compared to digital on-axis holography, to gain considerably in sensitivity due to the introduction of a spatial frequency shift on the cross-interference term of the signal wave and the reference wave (term $E_S E_R^*$ in equation (1)).

FIG. 1B shows a diagram of an off-axis digital holography microscopy device as described in the above-mentioned article. The device includes a Mach-Zehnder interferometer in which separating plates BS and mirrors M are arranged to form a reference arm and an object arm on which the object of study O is positioned. A laser source L illuminates the Mach-Zehnder interferometer at a given wavelength $\lambda$; an microscope lens MO, arranged on the object arm, is used to select a field from the object of study O. The signal and reference waves, whose electromagnetic fields are noted respectively $E_S$ and $E_R$, interfere in a detection plane of a two-dimensional detector C. In this arrangement, the signal and reference waves are angularly separated and their directions of propagation make angles $\theta \approx k_x/k$ and $\vartheta \approx k_y/k$, where $k_x$ and $k_y$ are respectively the projections of the wave vector of the reference wave on each of the axes x and y of an orthogonal reference frame defined in a plane perpendicular to the optical axis, and k is the norm of said wave vector, given by $k=2\pi/\lambda$ where $\lambda$ denotes the optical wavelength.

In this case, the interferogram I measured in the detection plane is written:

$$I = |E_S + E_R \exp(ik_x x + ik_y y)|^2$$

or:

$$I = |E_S|^2 + |E_R|^2 + E_S E_R^* \exp(-ik_x x - ik_y y) + E_S^* E_R \exp(ik_x x + ik_y y) \quad (2)$$

As shown in equation (2), the cross-interference term $E_S E_R^*$ which represents the wanted signal is now spatially separated from the auto-modulation terms $|E_S|^2$ and $|E_R|^2$, allowing it to be detected with a much greater sensitivity.

The device illustrated in FIG. 1B has the disadvantage, however, of being sensitive to the measurement environment; simple disturbances of the ambient air or vibrations can disturb the reference beam and therefore the measurement.

The US patent application 2017/0003650 also describes an off-axis digital holography microscopy device. In the described device, the reference wave is formed by double passage through a thick Bragg grating and then superimposed on the signal wave by means of separating plates and mirrors, as in the example of FIG. 1B, to interfere on a two-dimensional detector.

This description proposes a device and method for optical imaging by off-axis digital holography that allows, compared to known technologies, simple implementation, high compactness and excellent robustness at the same time very.

SUMMARY OF THE INVENTION

According to a first aspect, this description concerns an optical imaging device of an object by off-axis holography, comprising:

a light source for emitting an illumination wave of the object, in transmission or reflection;

an assembly formed of one or more thick Bragg gratings arranged to receive a wave coming from the illuminated object and to deflect by compliance to the Bragg's law a first component undisturbed by the object of said wave coming from the object, called reference wave, and to pass without deflection, because of the failure to comply with the Bragg's law, a second component of said wave coming from the object, called signal wave, such that the deflected reference wave presents predetermined deflection angles with respect to the non-deflected signal wave defined in two perpendicular planes, a two-dimensional detection device for acquiring an interferogram resulting from the interference between said deflected reference wave and said signal wave; and a calculation unit for determining, from said interferogram, an amplitude and phase distribution of the signal wave in the plane of the object.

The applicants demonstrated that the original arrangement, in an off-axis holographic imaging device, of an assembly of one or more Bragg gratings to form the reference wave and the signal wave, ensured robustness, compactness of the device and imaging quality. Indeed, the reference wave and the signal wave thus formed directly interfere at the output of the Bragg grating(s), thus avoiding that the device is subjected to external disturbances. Not only do thick Bragg gratings intrinsically generate a spatial low-pass filtering of the deflected wave (reference wave), which contributes to the very good quality of the reconstructed hologram, but in addition, the proposed original arrangement allows an extremely compact holographic imaging device to be formed. The applicants showed that with such an arrangement, the distance between the object and the detection device (sensor) could be reduced to less than 10 centimetres, advantageously less than one centimetre, or even less than a few millimetres.

According to one or more examples of embodiment, said assembly of one or more thick Bragg gratings comprises at least one first thick Bragg grating with index strata arranged in a first direction, with a first given pitch and at least one second thick Bragg grating with index strata arranged in a second direction, perpendicular to the first direction, with a second given pitch. This arrangement allows to obtain a deflection of the reference wave with respect to the non-deflected signal wave with deflection angles defined in two perpendicular planes.

According to one or more examples of embodiment, said assembly of one or more thick Bragg grating(s) comprises at least one first thick Bragg grating with multiplexed index strata, having index strata arranged in two perpendicular directions, with a given pitch in each direction. This arrangement also makes it possible to obtain a deflection of the reference wave with respect to the non-deflected signal wave with deflection angles defined in two perpendicular planes.

According to one or more examples of embodiment, said assembly of one or more thick Bragg grating(s) further comprises a second thick Bragg grating with multiplexed index strata, having index strata arranged in two perpendicular directions, with a given pitch in each direction, such that the total deflection angle of the deflected reference wave, measured in each of said perpendicular planes, is equal to the difference in the deflection angles introduced by each of said multiplexed thick Bragg gratings.

The combination of two thick Bragg gratings with multiplexed index strata allows, for thick Bragg gratings of a given thickness, to ensure a greater angular selectivity of the deflected reference wave.

According to one or more examples of embodiment, the optical imaging device of an object by off-axis holography also includes a microscope lens to form an image of a limited field of the object OBJ with a given magnification. This arrangement allows the device to be applied in off-axis holography microscopy.

In a second aspect, this description concerns a method of optical imaging of an object by off-axis holography comprising:

the illumination of the object in transmission or reflection by means of an illumination wave coming from a light source;

the sending on an assembly of one or more thick Bragg gratings of a wave coming from the illuminated object;

the deflection of a first component of the wave coming from the object, called the reference wave, while a second component of the wave coming from the object, called the signal wave, passes through said assembly of one or more Bragg gratings without being deflected, the deflected reference wave having predetermined deflection angles with respect to the non-deflected signal wave defined in two perpendicular planes, the acquisition by means of a two-dimensional detection device of an interferogram resulting from the interference between said deflected reference wave and said signal wave; and the calculation, from said interferogram, of an amplitude and phase distribution of the signal wave in the plane of the object.

BRIEF DESCRIPTION OF THE FIGURES

Other advantages and characteristics of the invention will appear upon reading the description, illustrated by the figures below, wherein.

DETAILED DESCRIPTION

Figure 1A:
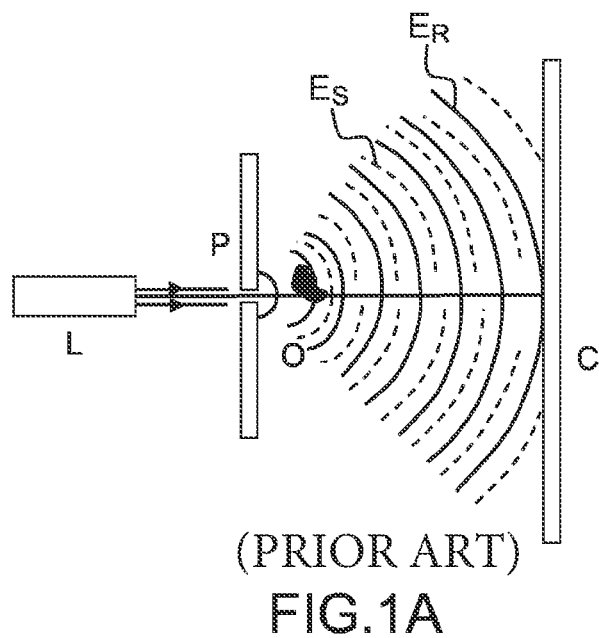
FIGS. 1A and 1B (already described) are schematics of on-axis and off-axis holographic microscopy devices, respectively, according to the prior art.
Figure 1B:
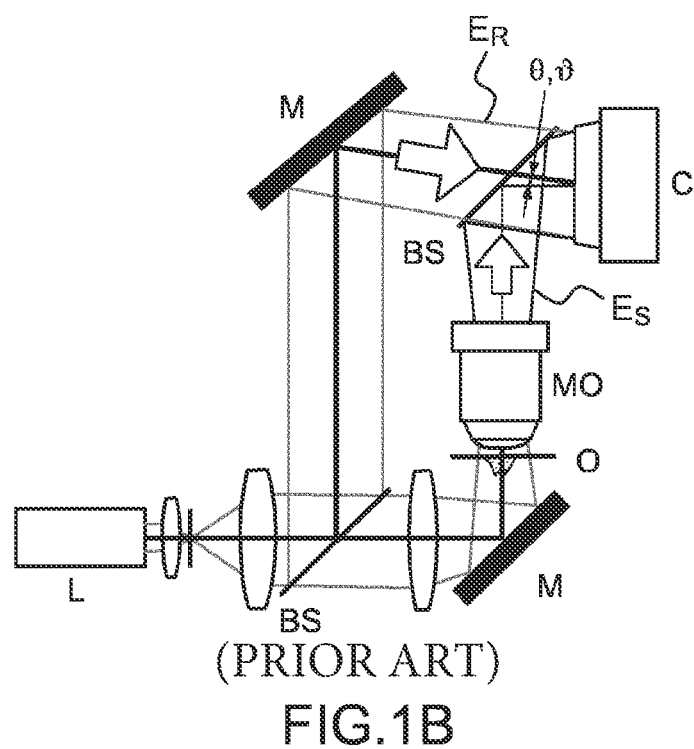
Figure 2:
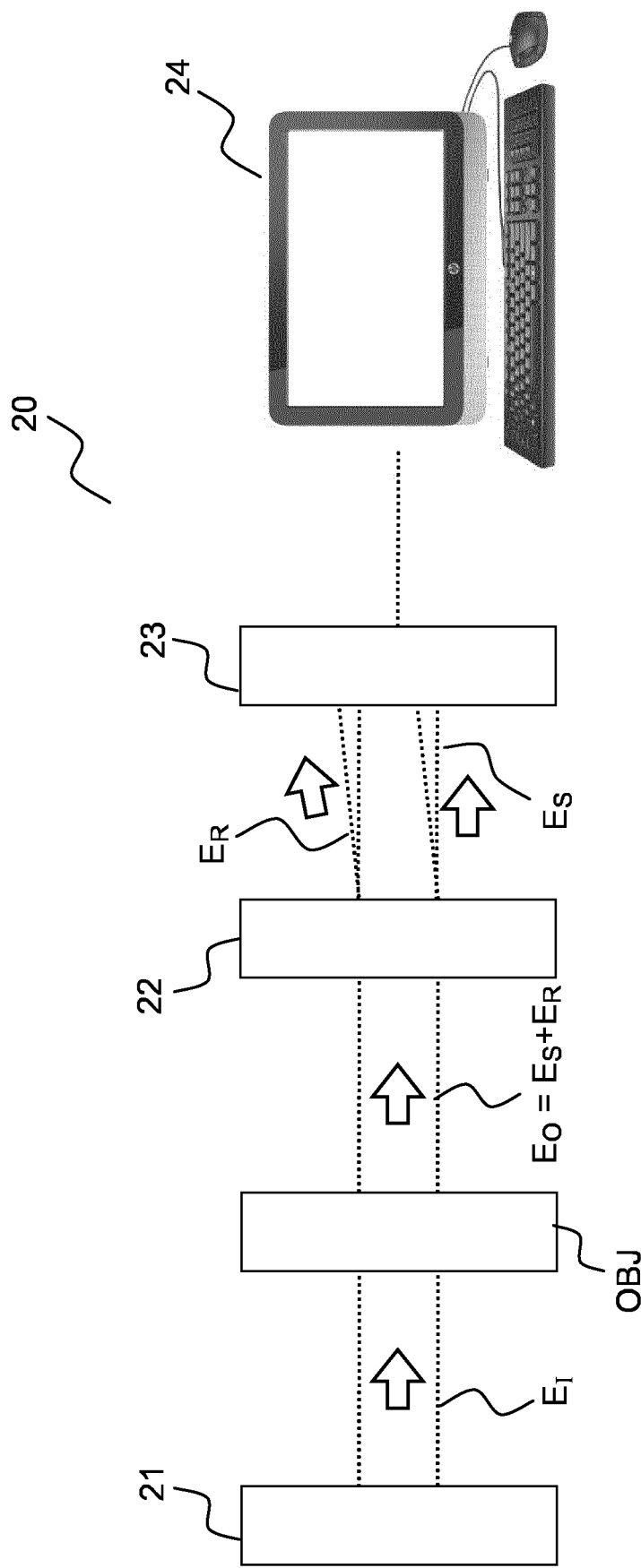
FIG. 2 is a diagram of an example of an off-axis holography optical imaging device as described herein.

FIG. 2 represents a diagram of an imaging device 20 example for an object OBJ according to this description. The object is for example a biological sample, for example a culture of living cells, or a material for microelectronics (semiconductor, glass, mirror).

The imaging device 20 includes a light source 21 adapted for emitting an illumination wave of the object OBJ, whose the electromagnetic field is noted $E_I$. Although represented in transmission in FIG. 2, the illumination of the object can be done in reflection, for example when the object is a semiconductor, glass, or mirror. The light source is for example a laser, a super luminescent diode (or SLD), an electroluminescent diode (or LED according to the abbreviation of the Anglo-Saxon expression "Light-Emitting Diode").

The imaging device 20 also includes an assembly 22 of one or more thick Bragg gratings to receive a wave coming from the object, with an electromagnetic field $E_O$. The wave coming from the object includes a first component formed by a wave coming from the object, or signal wave, of electromagnetic field $E_S$ and a second component formed by a wave coming from the source and not disturbed by the object, or reference wave, of electromagnetic field $E_R$. The wave coming from the object is in practice a wave resulting from the diffraction of the illumination wave by all the microstructures of the object, the microstructures being able to result for example from the inhomogeneities of the refractive index in an object observed in transmission. Under certain conditions of incidence of the reference wave, known as Bragg's law conditions, the reference wave is deflected by the thick Bragg grating 22 in a given direction and spatially filtered due to the intrinsic properties of the thick Bragg gratings. The signal wave, emitted by the object in an angular cone defined by the optogeometric characteristics of the imaging device, is always transmitted without being deflected due to the non-respect of the Bragg's law. The reference wave $E_R$ deflected and filtered by the thick Bragg grating 22 therefore interferes with the signal wave $E_S$ transmitted by the Bragg grating without being deflected. The result is an interference signal formed in a detection plane of a two-dimensional detection device 23; the two-dimensional detection device thus allows the acquisition of an interferogram resulting from said interference signal. A calculation unit 24 then makes it possible to determine, from said interferogram, an amplitude and phase distribution of the signal wave in the plane of the object.

The imaging device is therefore an off-axis digital holography device whose characteristics, particularly in terms of fringe pitch of the interference signal, fringe orientation in the plane of the detector, angular spectrum width of the reference wave, are given by the characteristics of the thick Bragg grating(s), as explained below. The "reconstruction" of the signal wave coming from the interferogram includes, for example, a Fresnel transformation in a known way, and can be done in the same way as that performed in known off-axis digital holography techniques.

It is of course possible to acquire a series of interferograms if, for example, dynamic imaging of the object (video) is desired. In this case, a reconstruction of the signal wave is performed for each interferogram.

For the acquisition of the interferogram(s), the two-dimensional detection device is, for example, a matrix detector of a CCD (Charge-coupled device) or CMOS (Complementary metal-oxide-semiconductor) camera.

Figure 3A:
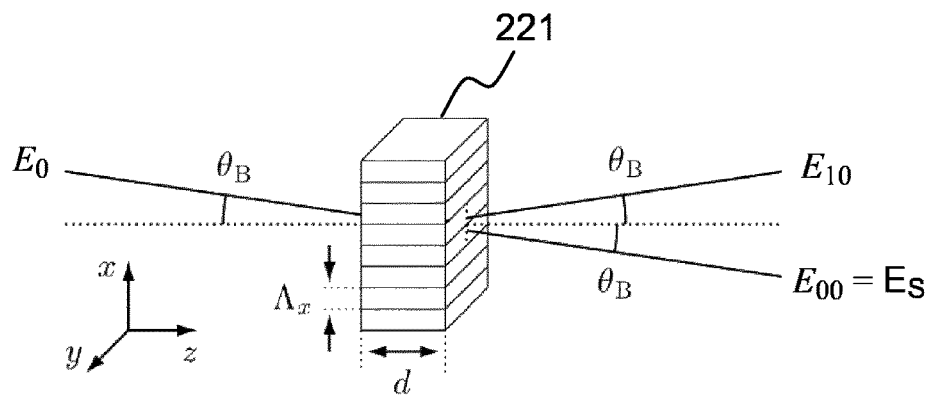
FIGS. 3A to 3C are diagrams illustrating the propagation of transmitted and deflected beams by thick Bragg gratings, respectively with so-called "horizontal" index strata (FIG. 3A), with so-called "vertical" index strata (FIG. 3B), and with so-called "multiplexed" index strata (FIG. 3C).
Figure 3B:
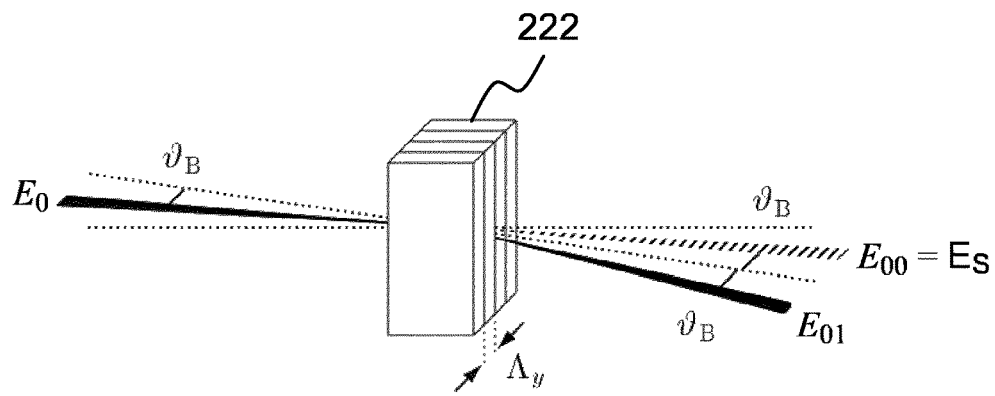
Figure 3C:
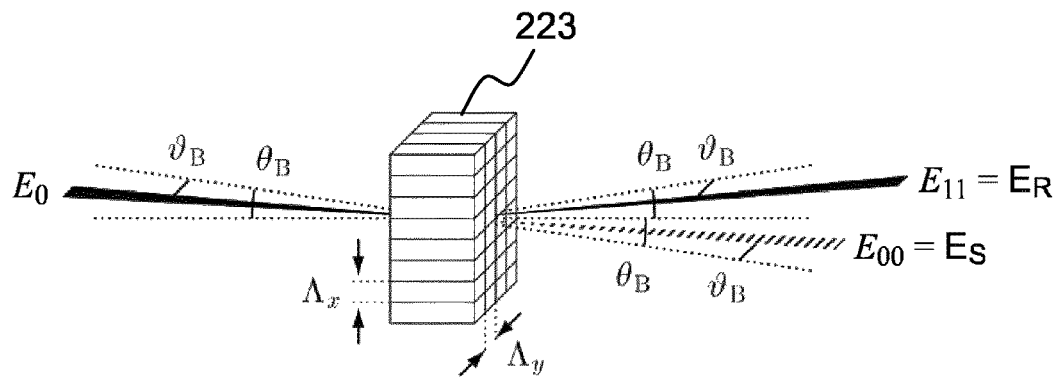

FIGS. 3A to 3C illustrate the propagation of the reference and signal waves in three thick Bragg gratings, one thick Bragg grating 221 with so-called "horizontal" pitch (or period) index strata $A_x$ (FIG. 3A), a thick Bragg grating 222 with so-called "vertical" pitch index strata $A_y$ (FIG. 3B) and a thick Bragg grating 223 with so-called "multiplexed" index strata with pitches $A_x$ and $A_y$, respectively (FIG. 3C).

In this description, a thick Bragg grating with so-called "horizontal" or "vertical" index strata is referred to as a thick Bragg grating with index modulation in a single preferred direction, allowing a set of parallel index strata to be defined. The terms "horizontal" and "vertical" are used arbitrarily and simply mean in this description that the two sets of strata of the two respective Bragg gratings are perpendicular. A thick Bragg grating with so-called "multiplexed" index strata is a thick Bragg grating with index modulation extending in two privileged directions, allowing to form two sets of multiplexed strata extending in two perpendicular directions.

According to an example, the refractive index n(x,y) in a Bragg grating can be written, in each of the perpendicular directions x and y:

$$n(x,y)=n_0+n_x \sin(2\pi x/\Lambda_x)+n_y \sin(2\pi y/\Lambda_y) \qquad (3)$$

Where $n_0$ is the average index, $\Lambda_x$ and $\Lambda_y$ the pitches (or periods) of the refractive index modulations along the two perpendicular directions x and y respectively and $n_x$ and $n_y$, the amplitudes of the refractive index modulations along the two perpendicular directions x and y respectively.

In practice, to obtain a two-dimensional image of the object, a thick Bragg grating with multiplexed index strata can be used as a first example or, as a second example, two thick Bragg gratings arranged one behind the other, with perpendicular index strata between them. In both examples, this makes it possible to define a direction of the deflected wave with respect to the signal wave by two angles defined in planes perpendicular to each other.

Thus, in an example of two successive gratings with "horizontal" and "vertical" index strata, for the first Bragg grating with "horizontal" index strata (FIG. 3A) it is possible to define an angle $\theta_B$ of the direction of an incident wave EO with respect to the planes of the grating strata in a plane perpendicular to the plane of the strata and containing the direction of the wave vector of the incident wave. For the second "vertical" index strata Bragg grating (FIG. 3B), it is possible to define an angle $\vartheta_B$ of the direction of an incident wave EO with respect to the plane of the grating strata in a plane perpendicular to the plane of the strata and containing the direction of the wave vector of the incident wave.

In addition, in an example of a thick Bragg grating with multiplexed index strata (FIG. 3C), the angles ($\theta_B$, $\vartheta_B$) of the direction of an incident wave with respect to the planes of the index strata of a thick Bragg grating with multiplexed index strata can be defined in two planes perpendicular to each other and containing respectively the direction of the wave vector of the incident wave and the normal to the index strata.

In practice, thick Bragg gratings with index strata characterized by an angle of inclination Φ with respect to a normal direction at the entrance face of the grating can be used. This makes it easier to mount the Bragg grating(s) in the device by working with an incident wave that is always normal to the input face of the grating while respecting the Bragg's law(s).

In both the first and second examples, a deflection of the reference wave with respect to the propagation direction of the signal wave may occur provided that the angles ($\theta_B$, $\vartheta_B$) verify the Bragg's law conditions of the grating(s), as described for example in Kogelnik et al. ("*Coupled wave theory for thick hologram gratings*." Bell Labs Technical Journal 48, no. 9 (1969): 2909-2947) and recalled below with reference to FIGS. 3A-3C.

In FIGS. 3A to 3C, the electromagnetic field of the wave coming from the object is noted $E_O$, composed of the reference wave and the signal wave. The electromagnetic field of the signal wave, transmitted by the grating without deviation, is noted $E_{00}$ (or $E_S$). As illustrated in FIG. 3A, under Bragg's law conditions, the incident reference wave on the "horizontal" layer grating 221 with an angle $\theta_B$ is deflected in a "vertical" plane of $2\theta_B$, the "vertical" plane being defined as the plane perpendicular to the plane of the strata of the "horizontal" strata grating, and containing the direction of the wave vector of the incident wave; the electromagnetic field of the deflected wave is noted $E_{10}$. In addition, as illustrated in FIG. 3B, again under Bragg's law conditions, the incident reference wave on the "vertical" strata grating 222 with an angle $\vartheta_B$ is deflected in a "horizontal" plane of $2\vartheta_B$, the "horizontal" plane being defined as the plane perpendicular to the plane of the strata of the "vertical" strata grating and containing the direction of the wave vector of the incident wave; the electromagnetic field of the deflected wave $E_{01}$. In the case of a thick Bragg grating 223 with "multiplexed" index strata (FIG. 3C), the reference wave incident with the angles ($\theta_B$, $\vartheta_B$) is deflected from $2\theta_B$ and $2\vartheta_B$ respectively; the electromagnetic field of the deflected wave is noted $E_{11}$.

Bragg angles $\theta_B$ and $\vartheta_B$ satisfy the following relationships in a known way:

$$2\sin(\theta_B) = \lambda/\Lambda_x \quad (4)$$

$$2\sin(\vartheta_B) = \lambda/\Lambda_y \quad (5)$$

Or, in the approximation of small angles:

$$2\theta_B \approx \lambda/\Lambda_x \quad (4')$$

$$2\vartheta_B \approx \lambda/\Lambda_y \quad (5')$$

Therefore, it is possible, for a given wavelength $\lambda$ of the illumination wave of the object, to choose pitches (or periods) $\Lambda_x$ and $\Lambda_y$ of the refractive index modulations in two mutually perpendicular directions ("horizontal" and "vertical" strata), respectively, in order to determine the angle ($2\theta_B, 2\vartheta_B$) formed between the reference wave and the signal wave.

Figure 4A:
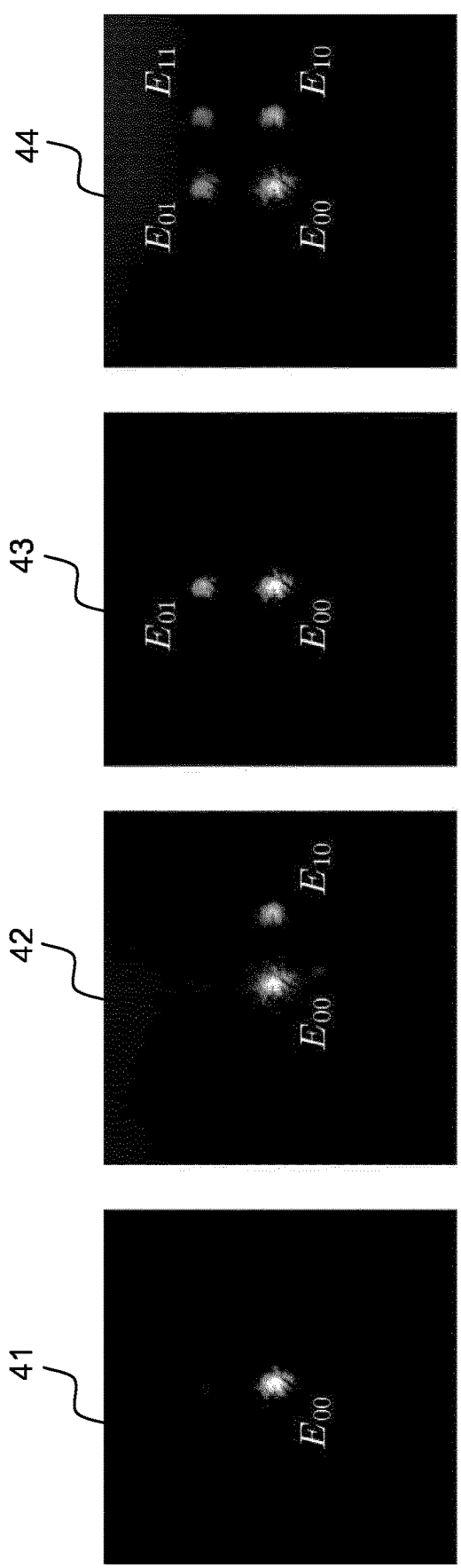
FIGS. 4A and 4B show series of images obtained experimentally and showing respectively (FIG. 4A) the electromagnetic field strength of the waves transmitted and deflected by the Bragg grating, for different Bragg's law conditions and (FIG. 4B) interferograms acquired by the camera and digitally reconstructed holograms.

The four electromagnetic fields $E_{00}$, $E_{10}$, $E_{01}$, and $E_{11}$ correspond to light beams detectable by a matrix detector arranged downstream of the Bragg grating(s), as shown in FIG. 4A.

More precisely, FIG. 4A represents experimental results of deflection of an incident wave on an assembly of two thick Bragg gratings arranged one behind the other; a first thick Bragg grating with "horizontal" index strata (as shown in FIG. 3A) and a second thick Bragg grating with "vertical" index strata (as shown in FIG. 3B). Each of the gratings is characterized by an average refractive index ($n_0$=1.5), a pitch of the refractive index modulation (respectively $\Lambda_x$=18.9 μm, $\Lambda_y$=18.3 μm), a thickness (respectively $d_x$, $d_y$=8.9 mm) of the grating, a modulation depth of the refractive index (respectively $n_x$, $n_y$=1.4 $10^{-5}$), an inclination angle (respectively $\Phi_x$, $\Phi_y$=90°) of the index strata with respect to the entry face of the grating.

The incident wave is a wave coming from an object (a sight) illuminated in transmission by means of a laser source emitting at $\lambda$=660 nm. A camera with 2048×2048 elementary detectors (or pixels) allows the acquisition of images. Images 41-44 represented in FIG. 4A are obtained with a collimated incident beam of about 1 mm in diameter, by modifying the inclination of thick Bragg gratings. Image 41 in FIG. 4A corresponds to a case where the Bragg condition is not met for either of the two gratings. Only the non-deflected beam $E_{00}$ (signal wave coming from the object) is transmitted. Image 42 in FIG. 4A corresponds to a case where the Bragg condition is only satisfied for the "horizontal" strata grating. The non-deflected beam $E_{00}$ (signal wave coming from the object) and the beam $E_{10}$ deflected by $2\theta_B$ in a "vertical" plane are transmitted through the grating. Image 43 in FIG. 4A corresponds to a case where the Bragg condition is only satisfied for the vertical strata grating. The non-deflected beam $E_{00}$ (signal wave coming from the object) and the beam $E_{01}$ deflected by $2\vartheta_B$ in a "horizontal" plane are transmitted through the grating. Image 44 in FIG. 4A corresponds to a case where the Bragg condition is met for the horizontal and vertical strata gratings. The non-deflected beam $E_{00}$ (signal wave coming from the object), the beam $E_{10}$ deflected by $2\theta_B$ in a "vertical" plane, the beam $E_{01}$ deflected by $2\vartheta_B$ in a "horizontal" plane, are transmitted by the grating. A fourth beam $E_{11}$, deflected by $2\theta_B$ in a "vertical" plane and by $2\vartheta_B$ in a "horizontal" plane is transmitted.

Figure 4B:
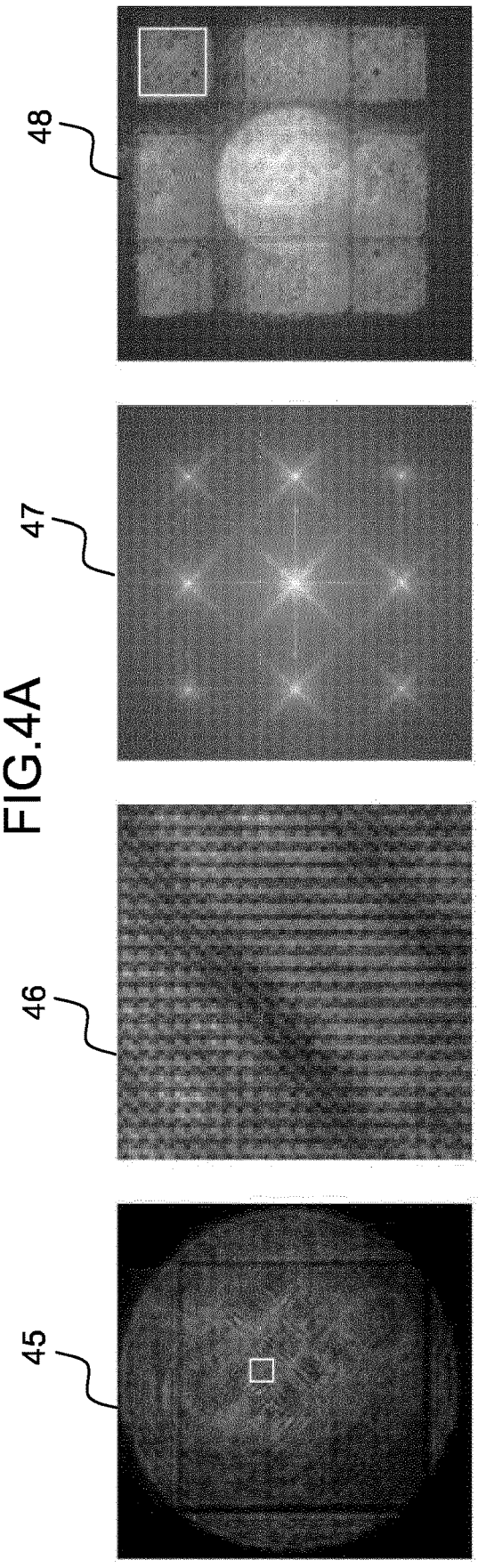

FIG. 4B represents an experimentally obtained interferogram (images 45, 46), a Fourier transform (image 47) calculated from said interferogram and a hologram (image 48) reconstructed from the calculated Fourier transform. The interferogram shown in image 45 results from the interferences between the beams transmitted by the Bragg gratings with "horizontal" and "vertical" index strata respectively (experimental conditions identical to those described in FIG. 4A), when the Bragg conditions are met for both gratings (conditions corresponding to image 44 in FIG. 4A), but for an incident beam with a larger diameter, about 11 mm, illuminating the entire object. The four electromagnetic field waves $E_{00}$, $E_{10}$, $E_{01}$, and $E_{11}$ respectively interfere in the overlap area of the respective beams to form the interferogram shown in image 45. Image 46 is an enlargement of the area bounded by a white square in image 45.

Thus, the total field $E_t$ is the sum of the four transmitted fields:

$$E_t = E_{00} + E_{10}e^{\{ik_x x\}} + E_{01}e^{\{ik_y y\}} + E_{11}e^{\{ik_x x + ik_y y\}} \quad (6)$$

Where:

$$k_x = 4\pi\theta_B/\lambda \quad (7)$$

$$k_y = 4\pi\vartheta_B/\lambda \quad (8)$$

The interferogram is given by the intensity of the total field strength:

$$I = |E_t|e^{\wedge}2 \quad (9)$$

The cross-interference term $E_{00} E_{11}^*$ of the interferogram thus calculated represents the useful signal for hologram reconstruction.

Image 47 corresponds to the amplitude of the spatial Fourier transform of the interferogram shown in image 45. The useful component of this signal, corresponding to the cross-interference term $E_{00} E_{11}^*$, appears in the upper right corner on the calculated amplitude of the spatial Fourier transform of the interferogram, shown in image 47 of FIG. 4B.

Image 48 is the hologram calculated in the plane of the object by a discrete Fresnel transform of the interferogram; a calculation method is described for example in the article by N. Verrier et al. ("*Off-axis digital hologram reconstruction: some practical considerations.*" Applied optics 50, no. 34 (2011): H136-H146). The hologram region in the upper right corner of image 48 corresponds to the amplitude of the discrete Fresnel transform of the cross-interference term $E_{00} E_{11}^*$ calculated in the plane of the object. The phase of this hologram corresponds to the phase difference between field $E_{00}$ and field $E_{11}$ calculated in the plane of the object.

In practice, for the implementation of the off-axis digital holography method according to this description, the choice of pitches $\Lambda_x$ and $\Lambda_y$ of the horizontal and vertical strata may be made taking into account the sampling rules dictated by the Nyquist-Shannon theorem. The angles of deflection $2\theta_B$ and $2\vartheta_B$ between the electromagnetic field waves $E_{11}$ (deflected reference wave) and $E_{00}$ (transmitted signal wave) advantageously satisfy conditions $2\theta_B \in [-\theta_S/2, \theta_S/2]$ and $2\vartheta_B \in [-\vartheta_S/2, \vartheta_S/2]$, with:

$$2\theta_S \approx \lambda/d_x \quad (10)$$

$$2\vartheta_S \approx \lambda/d_y \quad (11)$$

Where $\theta_S$ and $\vartheta_S$ are called coherent detection acceptance angles, and $d_x$ and $d_y$, respectively, the pitches between the elementary detectors (or "pixels") of the two-dimensional detector, in the x and y directions, respectively.

The applicants showed that the use of thick Bragg gratings for the formation of signal and reference waves in an off-axis digital holography assembly is very robust, especially since the reference wave is formed from the object wave. Thus, the phase of the hologram corresponds strictly to the phase difference between field $E_{00}$ and field $E_{11}$ calculated in the plane of the object. In other words, phase fluctuations that may be present in separate arm interferometry assemblies are avoided here.

In addition, it is remarkable to note that a thick Bragg grating generates a spatial filtering of the deflected wave, which contributes to forming an angularly low-pass filtered reference wave and therefore, a very good quality hologram.

More precisely, the angular width of the beams deflected by thick Bragg gratings, respectively with "horizontal" index strata (FIG. 3A) and "vertical" index strata (FIG. 3B), of average index no and thickness d, are respectively $\Delta\theta_1$ and $\Delta\vartheta_1$, with (see Kogelnik et al. previously mentioned, as well as Ciapurin et al. "Modeling of phase volume diffractive gratings, part 1: transmitting sinusoidal uniform gratings." Optical Engineering 45, no. 1 (2006): 015802-015802):

$$\Delta\theta_1 \approx n_0 \Lambda_x / d \quad (12)$$

$$\Delta\vartheta_1 \approx n_0 \Lambda_y / d \quad (13)$$

The thickness d of a Bragg grating is defined by the thickness through which the incident wave will pass. In a thick Bragg grating designed to work at normal incidence with respect to the grating entry face (index strata inclined at an angle F with respect to a normal direction at the entry face of the grating), the thickness d of the thick Bragg grating can simply be the distance between the entry and exit faces.

Thus, for example, for a thickness of each Bragg grating thick $\approx 9$ mm, an average index $n_0 \approx 1.5$ (average index of glass) and pitch values $\Lambda_x \approx 18.9$ μm et $\Lambda_y \approx 18.3$ μm, $\Delta\theta_1 = \Delta\vartheta_1 \approx 3.3$ mrad are obtained, which is equivalent, in an interferometer of the "point diffraction interferometer" type as described in the reference Smartt, R. N. et al. ("Point-Diffraction Interferometer". Journal of the Optical Society of America. 62: 737 (1972)) to filtering by a 330 μm diameter pupil, placed in the focus of a 10 cm focal lens.

It is therefore possible to adapt the pitches of the index strata $\Lambda_x$ and $\Lambda_y$ and the grating thickness d according to the angular width $(\Delta\theta_1, \Delta\vartheta_1)$ required for the deflected reference wave.

Figure 5A:
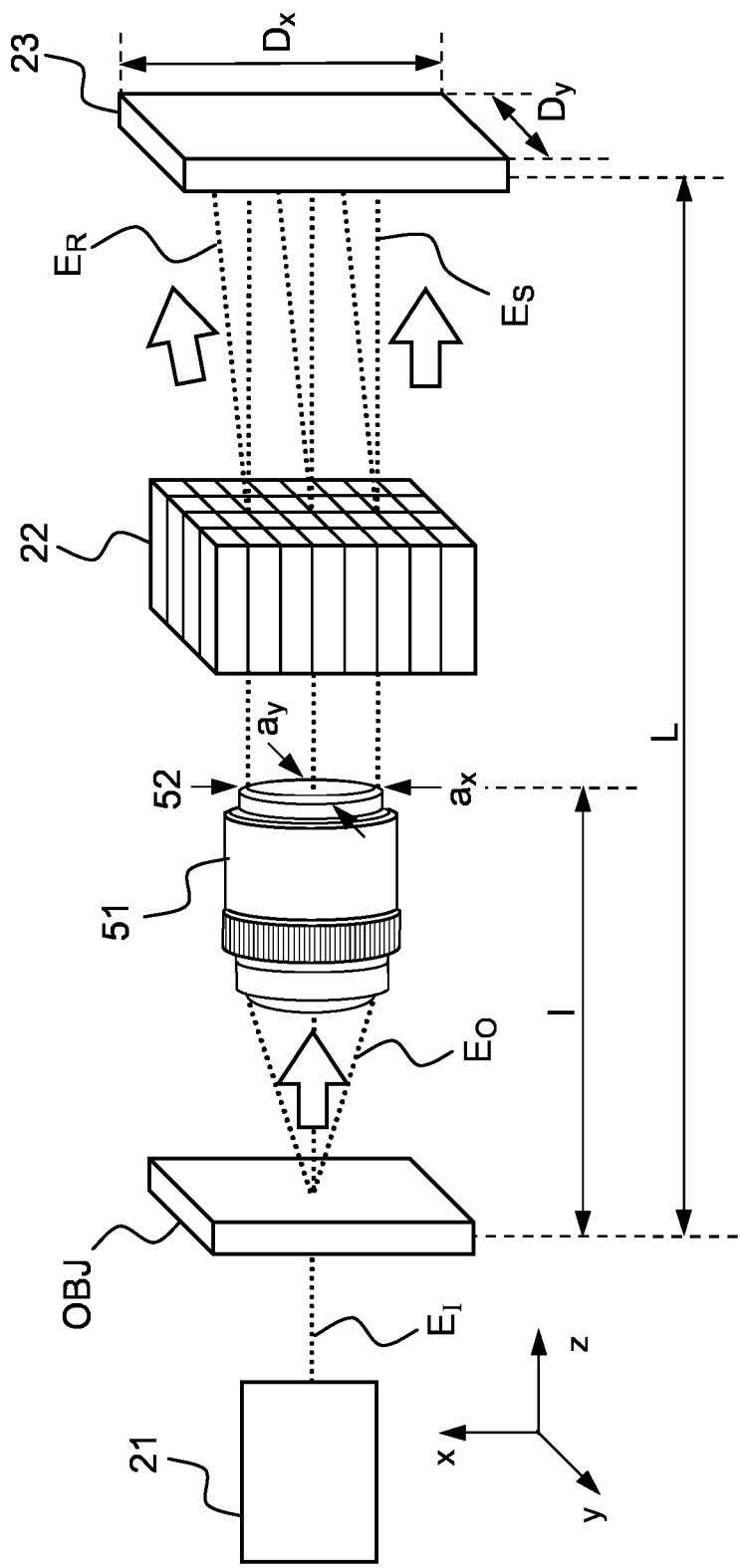
FIGS. 5A and 5B are diagrams showing examples of off-axis holographic optical imaging devices as described in this description with a microscope lens and a field pupil, respectively.
Figure 5B:
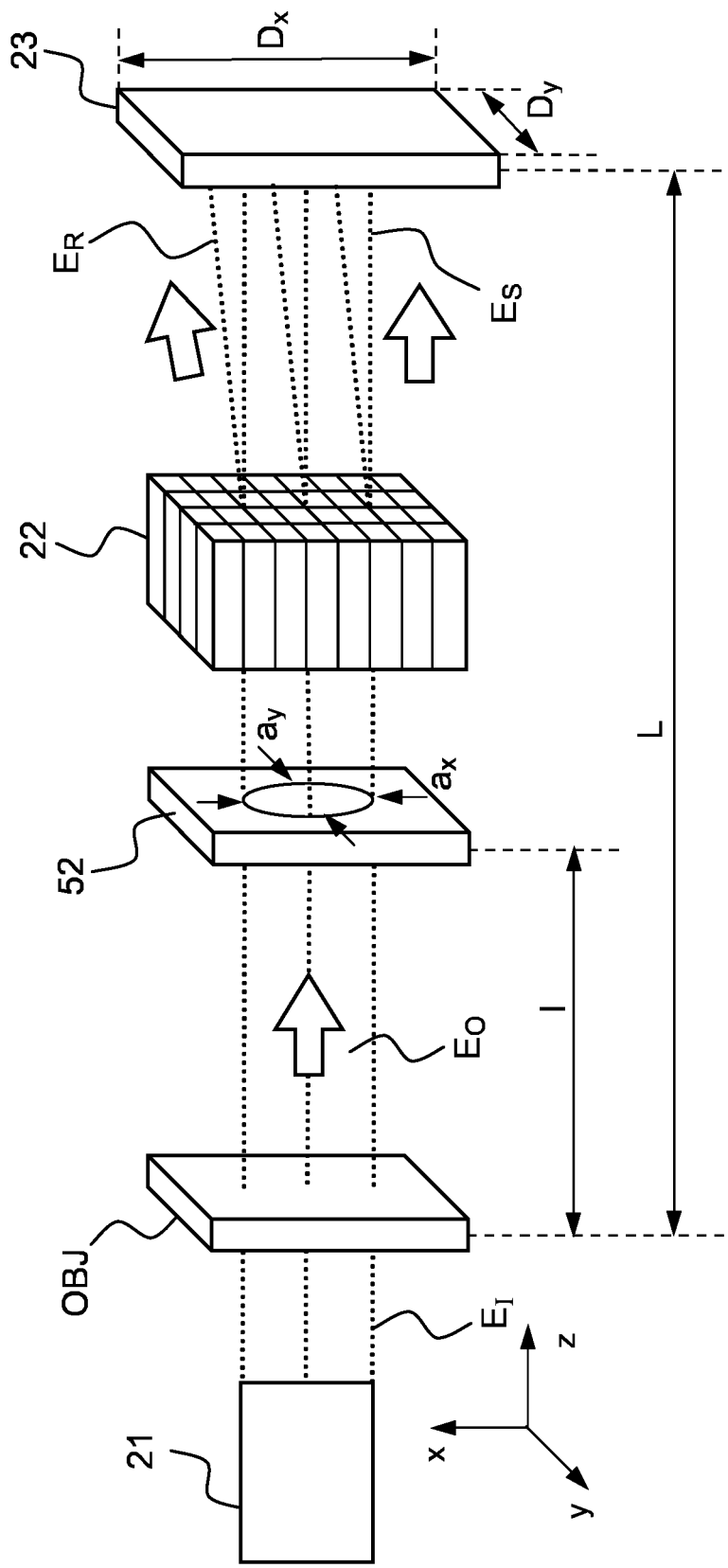

FIGS. 5A and 5B illustrate two examples of embodiment, with and without microscope objective, of an off-axis digital holography device according to this description. In each of these examples, the off-axis digital holography device includes, as in the example of FIG. 2, a light source 21 adapted for emitting an illumination wave of an object OBJ, an array 22 of one or more thick Bragg gratings, a two-dimensional detector 23. Although represented in transmission in FIG. 2, the illumination of the object can be done in reflection.

In the example of FIG. 5A, a microscope lens 51 allows to form an image of a limited field of the object OBJ with a given magnification. The method implemented by the device then becomes an optical microscopy method using off-axis digital holography. In practice, the microscope lens is designed to reflect the image of the object to infinity, i.e. the object is placed at the working distance of a so-called "infinity-focus" lens. The microscope objective 51 is defined by a numerical aperture NA limiting in practice the angular bandwidths $\Delta\theta_0$ and $\Delta\vartheta_0$ of the wave coming from the object. The microscope lens forms a field diaphragm 52 that extends and limits the angular bandwidth of the field wave $E_O$ from the object with respect to detection without a lens. More precisely, the angular bandwidth $(\Delta\theta_0, \Delta\vartheta_0)$ of the wave coming from the object is defined by:

$$\Delta\theta_0 = \Delta\vartheta_0 = 2\arcsin(NA) \quad (14)$$

FIG. 5B illustrates another example in which there is no microscope lens. The angular bandwidth of the field wave $E_0$ from the object is limited by the dimensions $D_x$, $D_y$ in the absence of a field diaphragm, or by dimensions $a_x$, $a_y$ of a field diaphragm arranged within the device, as it is the case on the FIG. 5B.

In the first case, the angular bandwidth $(\Delta\theta_0, \Delta\vartheta_0)$ of the wave coming from the object is defined by $$\Delta\theta_0 \approx D_x/L \quad (15)$$

$$\Delta\vartheta_0 \approx D_y/L \quad (16)$$

Where $D_x$ and $D_y$ are the dimensions of the image field defined by the detector, respectively along the x and y axes, and L is the distance between the plane of the object and the detector.

In the second case, the angular bandwidth $(\Delta\theta_0, \Delta\vartheta_0)$ of the wave coming from the object is defined by $$\Delta\theta_0 \approx a_x/\ell \quad (17)$$

$$\Delta\vartheta_0 \approx a_y/\ell \quad (18)$$

Where $a_x$ and $a_y$ are the dimensions of the field diaphragm 52, respectively along the x and y axes, and l is the distance between the plane of the object and the field diaphragm.

Figure 6:
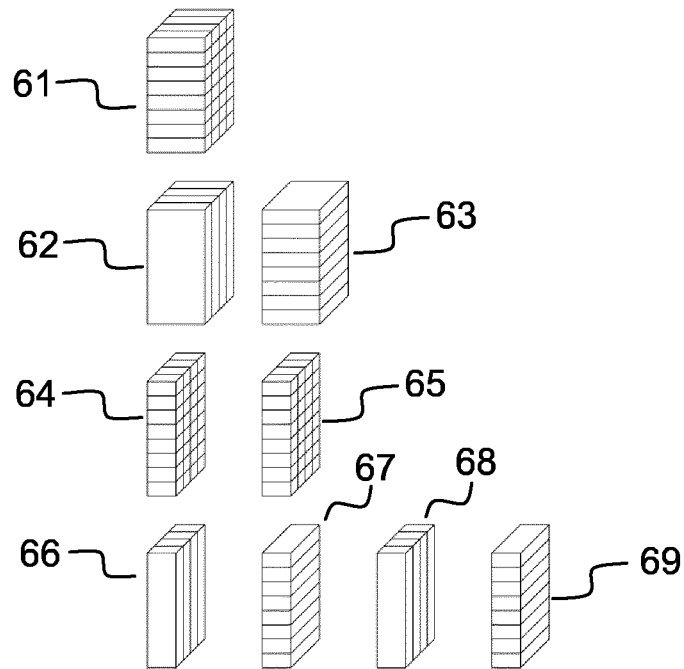
FIG. 6 shows diagrams illustrating different assemblies of one or more thick Bragg gratings, for the implementation of the off-axis holography method according to this description.

In practice, as described above, for the implementation of the off-axis holography method according to this description and illustrated in FIG. 6, it is possible to use a thick Bragg grating with multiplexed index strata 61, or an arrangement of two Bragg gratings 62, 63, respectively, with horizontal index strata and vertical index strata.

As will be described in relation to FIG. 7, it may also be advantageous to split each of the gratings to obtain an assembly of two thick Bragg gratings with multiplexed index strata 64, 65 or an assembly of four Bragg gratings 66, 67, 68, 69 with horizontal and vertical index strata, respectively. Dual grating configurations have the advantage of increasing the spatial filtering power for a fixed total Bragg grating thickness, compared to an unduplicated grating configuration. Such thick Bragg gratings can be manufactured in a known manner, for example by ultraviolet light exposure of a photo-thermo-refractive doped glass material, as described in the following article by Efimov et al. ("High-efficiency Bragg gratings in photothermorefractive glass." Applied Optics 38, no. 4 (1999): 619-627).

Figure 7:
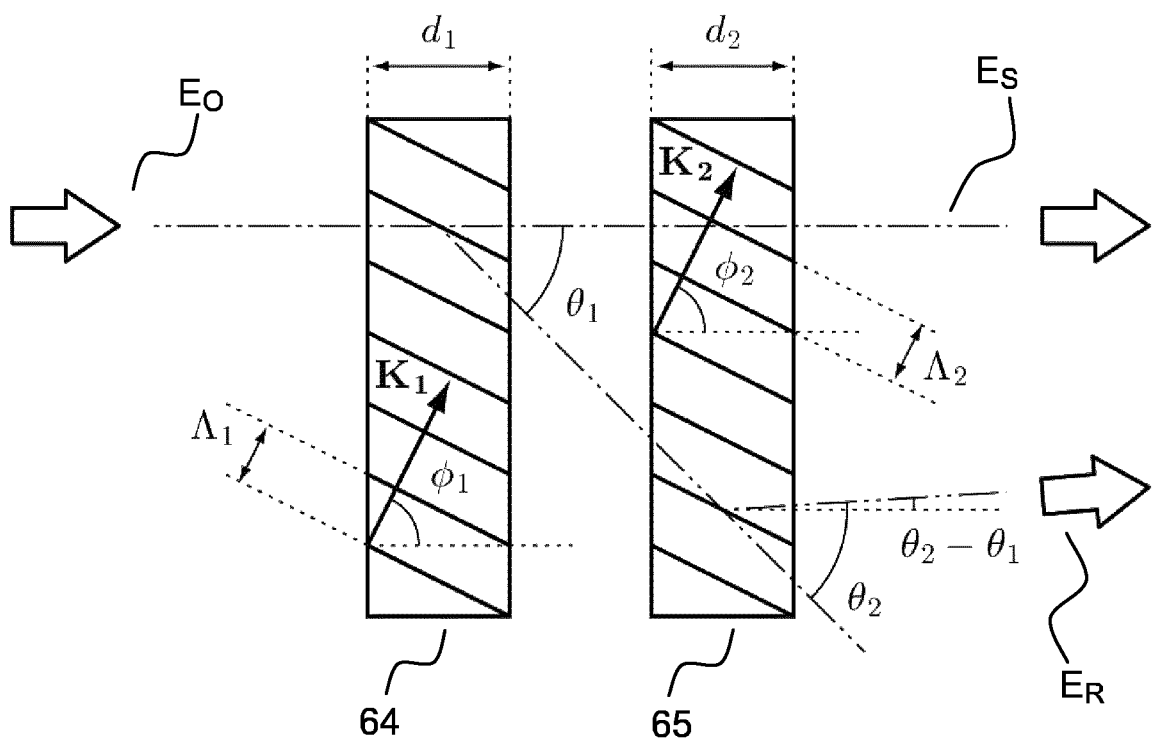
FIG. 7 is a diagram illustrating a layout with two thick Bragg gratings such that the angle(s) of deflection resulting from the successive deflection(s) is of the order of the angle(s) of deflection sought for the implementation of off-axis holographic imaging according to this description.

In particular, FIG. 7 presents a possible configuration in which two thick Bragg gratings with multiplexed index strata 64, 65 arranged one behind the other are used. Their periods $\Lambda_1$ and $\Lambda_2$, and orientations of the phase strata $\Phi_1$ and $\Phi_2$, are such that the total deflection angle $\theta_2-\theta_1$ is the angle of the desired reference wave. In other words, in the dual grating configuration, the deflection angles of the reference wave relative to the object wave are the algebraic sum of the deflection angles of each grating.

This configuration has the advantage of ensuring greater angular selectivity ($\Delta\theta_1$, $\Delta\vartheta_1$) of the wave $E_{11}$, for given grating thicknesses. Indeed, in a single thick Bragg grating, the search for small deflection angles between the reference wave and the object wave results in important index strata pitches (see equations (3) and (4)). To benefit from a good filtering power of the reference wave (equations (12), (13)), it is then necessary to increase the thickness d of the grating, which is not desirable beyond a certain limit. The configuration with split Bragg gratings allows to work with gratings that remain thin.

For example, two successive gratings of periods $\Lambda_1=1.5$ microns and $\Lambda_2=1.9$ microns each 2.25 mm thick, with orientation angles of the strata $\Phi_1 \approx \Phi_2 \approx 80$ degrees, allow an angular selectivity in the order of $\Delta\theta_0 \approx 1$ mrad, and a deflection angle between the reference wave and the object wave of about 1.5 degree. To obtain an angular selectivity in the order of $\Delta\theta_0 \approx 1$ mrad and a deflection angle between the reference wave and the object wave of about 1.5 degrees with a single grating, its pitch must be about 20 microns and its thickness must be about 30 mm. The distance between the object and the detector in a device as shown in FIG. 7 can thus be less than a centimetre.

Although FIG. 7 has a configuration with two multiplexed thick Bragg gratings, it was quite possible to apply it to thick Bragg gratings with horizontal or vertical strata, in which case an assembly of four thick Bragg gratings (gratings 66-69, FIG. 6) can be obtained.

Although described through a number of detailed exemplary embodiments, the off-axis digital holography optical imaging method and device according to this description comprise different alternative embodiments, modifications and improvements which will be obvious to those skilled in the art, it being understood that these different alternative embodiments, modifications and improvements fall within the scope of the invention as defined in the following claims.

The invention claimed is:

1. An optical imaging device of an object by off-axis holography comprising:
a light source for emitting an illumination wave on the object, in transmission or reflection;
an assembly formed of one or more thick Bragg gratings arranged to receive a wave coming from the illuminated object and to deflect by compliance to the Bragg's law a first component undisturbed by the object of said wave coming from the object, referred to as reference wave, and to let pass without deflection, because of the non-compliance to the Bragg's law, a second component of said wave coming from the object, called the signal wave, so that the deflected reference wave presents predetermined deflection angles defined in two perpendicular planes with respect to the non-deflected signal wave,
a two-dimensional detection device configured for acquiring an interferogram resulting from the interference between said deflected reference wave and said non-deflected signal wave, wherein the two-dimensional detection device is directly arranged at the output of said assembly formed of one or more thick Bragg gratings such that said reference wave and said signal wave are not angularly deflected between said assembly and the two-dimensional detection device; and
a computing unit for determining, from said interferogram, an amplitude and phase distribution of the signal wave in the plane of the object.

2. The optical imaging device according to claim 1, wherein said assembly formed of one or more thick Bragg gratings comprises at least one first thick Bragg grating with multiplexed index strata, having index strata arranged in two perpendicular directions, with a given pitch in each of the directions.

3. The optical imaging device according to claim 2, wherein said assembly formed of one or more thick Bragg gratings further comprises a second thick Bragg grating with multiplexed index strata, having index strata arranged in two perpendicular directions, with a given pitch in each direction, such that the deflection angle of the deflected reference wave, measured in each of said perpendicular planes, is equal to the difference in the deflection angles introduced by each of said multiplexed thick Bragg gratings.

4. The optical imaging device according to claim 1, wherein said assembly formed of one or more thick Bragg gratings comprises at least one first thick Bragg grating with index strata arranged in a first direction, with a first given pitch and at least one second thick Bragg grating with index strata arranged in a second direction, perpendicular to the first direction, with a second given pitch.

5. The optical imaging device according to claim 1, further comprising a microscope lens for forming an image of a limited field of the object with a given magnification.

6. A method for optical imaging of an object by off-axis holography comprising the steps of:
illuminating the object in transmission or reflection by means of an illumination wave coming from a light source;
sending a wave coming from the illuminated object onto an assembly formed of one or more thick Bragg gratings;
deflecting, in compliance with Bragg's law, a first component of said wave coming from the illuminated object, wherein said first component is not disturbed by the object and is referred to as the reference wave, while a second component of said wave coming from the illuminated object passes through said assembly formed of one or more Bragg gratings without being deflected, due to non-compliance with Bragg's law, wherein the reference wave has a predetermined deflection angle defined in two perpendicular planes relative to the signal wave;
combining said reference wave and said signal wave to produce an interferogram on a two-dimensional detection device, wherein said two-dimensional detection device is directly arranged at the output of said assembly formed of one or more thick Bragg gratings such that said reference wave and said signal wave are not angularly deflected between said assembly and the two-dimensional detection device; and calculating, from said interferogram, an amplitude and phase distribution of the signal wave in the plane of the object.

\* \* \* \* \*